(12) United States Patent
Stephenson

(10) Patent No.: US 7,207,166 B2
(45) Date of Patent: Apr. 24, 2007

(54) SIDE-PULL MOWER-CONDITIONER TONGUE PIVOTABLY MOUNTED TO PLATFORM FRAME AT LOCATION INBOARD OF PLATFORM GEARBOX

(75) Inventor: Roger Dale Stephenson, Ottumwa, IA (US)

(73) Assignee: Deere & Company, Moline, IL (US)

( * ) Notice: Subject to any disclaimer, the term of this patent is extended or adjusted under 35 U.S.C. 154(b) by 270 days.

(21) Appl. No.: 11/049,136

(22) Filed: Feb. 2, 2005

(65) Prior Publication Data

US 2006/0168930 A1 Aug. 3, 2006

(51) Int. Cl.
*A01D 34/24* (2006.01)
*A01D 34/42* (2006.01)
*A01D 34/63* (2006.01)

(52) U.S. Cl. ............................................. 56/15.2
(58) Field of Classification Search ................ 56/15.2, 56/14.9, 15.1, 218
See application file for complete search history.

(56) References Cited

U.S. PATENT DOCUMENTS

| 1,908,095 | A | | 5/1933 | York et al. |
| 3,832,837 | A | | 9/1974 | Burkhart et al. |
| 4,009,554 | A | | 3/1977 | Adee |
| 4,177,625 | A | * | 12/1979 | Knight et al. ............... 56/13.6 |
| 4,187,664 | A | * | 2/1980 | Meek et al. ................. 56/13.6 |
| 4,723,396 | A | * | 2/1988 | Ermacora ................... 56/13.6 |
| 5,794,424 | A | * | 8/1998 | Ermacora et al. ........... 56/15.1 |
| 5,901,533 | A | * | 5/1999 | Ermacora et al. ............. 56/6 |
| 5,901,537 | A | * | 5/1999 | Walch et al. ............... 56/15.2 |
| 6,189,306 | B1 | * | 2/2001 | Walch ....................... 56/15.1 |
| 6,269,619 | B1 | * | 8/2001 | Walch et al. ............... 56/14.9 |
| 7,047,714 | B1 | * | 5/2006 | Stephenson et al. ......... 56/15.2 |

* cited by examiner

Primary Examiner—Árpád Fábián Kovács

(57) ABSTRACT

A rotary side-pull mower-conditioner includes a gearbox mounted to the header frame at a location spaced vertically above the leftmost cutting unit of the rotary cutterbar. A tongue support projects forwardly from a crossbeam of the mobile carrier frame of the mower-conditioner at a location spaced rightward of the gearbox. A tongue has a rear end coupled to a forward region of the tongue support, and is swingable about an upright axis between a leftmost operating position, wherein the tongue passes forward of the tongue support, and a rightmost transport position. The tongue has a rear section which is approximately at the same height as the gearbox when the header is in a raised transport position. Sufficient clearance exists between the tongue and header when the header is in its lowered working position so as to permit full vertical floating movement of the header without interfering with the tongue.

6 Claims, 3 Drawing Sheets

US 7,207,166 B2

SIDE-PULL MOWER-CONDITIONER TONGUE PIVOTABLY MOUNTED TO PLATFORM FRAME AT LOCATION INBOARD OF PLATFORM GEARBOX

FIELD OF THE INVENTION

The present invention relates to a rotary side-pull mower-conditioner, and more specifically, relates to the relationship of the tongue and platform gearbox of such a mower-conditioner.

BACKGROUND OF THE INVENTION

Rotary side-pull mower-conditioners typically have the platform input gearbox located on the left side of the platform above the first disk of the cutterbar. The tongue or carrier frame structure of side-pull mower-conditioners have traditionally been over the top, or leftward of the platform input gearbox.

Placing the tongue or carrier frame structure over the top of the gearbox requires additional height of the structure to give adequate float and lift height of the platform. The extra height of the tongue requires the structure to be heavier to handle the higher bending moment exerted by the draft tongue.

Alternatively, placing the tongue and carrier frame outside of the input gear box in order to minimize the bending moments adds to the transport width of the machine.

The problem to be solved by the present invention is that of providing a draft tongue location which does not include either of the above-noted drawbacks.

SUMMARY OF THE INVENTION

According to the present invention, there is provided a rotary side-pull mower-conditioner having an improved tongue mounting arrangement.

An object of the invention is to provide a rotary side-pull mower-conditioner having a tongue mounted so that moments caused by draft loads are minimized while affording adequate clearance for the platform, together with the gearbox, to float over obstacles, and while also minimizing the operating width of the mower-conditioner.

An additional object of the invention is to provide a rotary side-pull mower-conditioner which has a tongue so mounted relative to the drive gearbox that the tongue does not have to swing over the top of the gearbox as the tongue moves between transport and operating positions relative to the platform. Because there is no requirement for the tongue to pass over the gearbox, the gearbox can be mounted at a higher location relative to the cutterbar, which results in increased space between the cutterbar and the horizontal wall supporting the gearbox for the passage of large volumes of crop.

The stated objects are achieved by mounting the draft tongue at a location to the right of the gearbox.

DESCRIPTION OF THE PREFERRED EMBODIMENT

Figure 1:
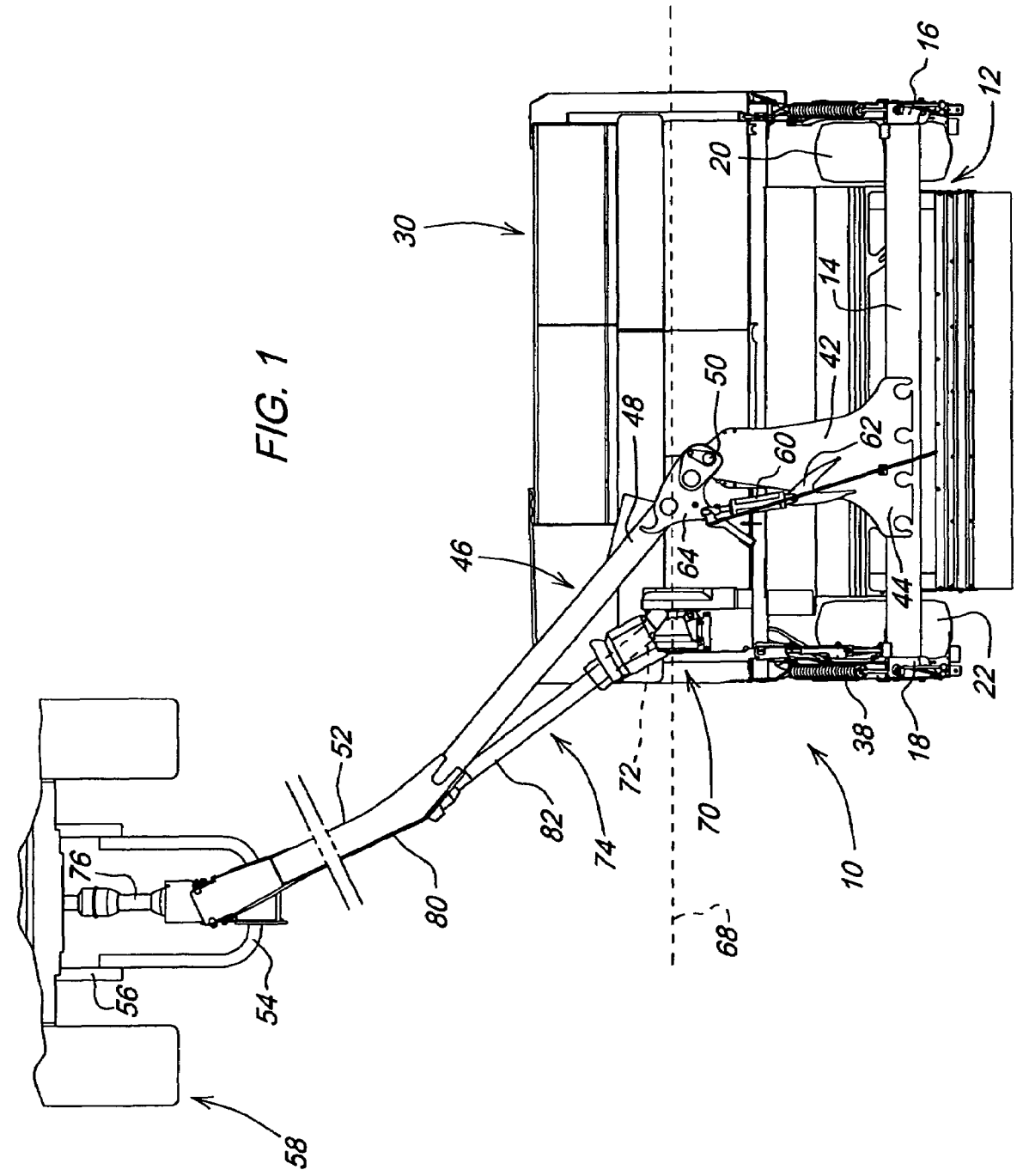
FIG. 1 is a somewhat schematic top view of a rotary side-pull mower-conditioner shown coupled to a towing tractor and having tongue and gearbox placements in accordance with the principles of the present invention.
Figure 2:
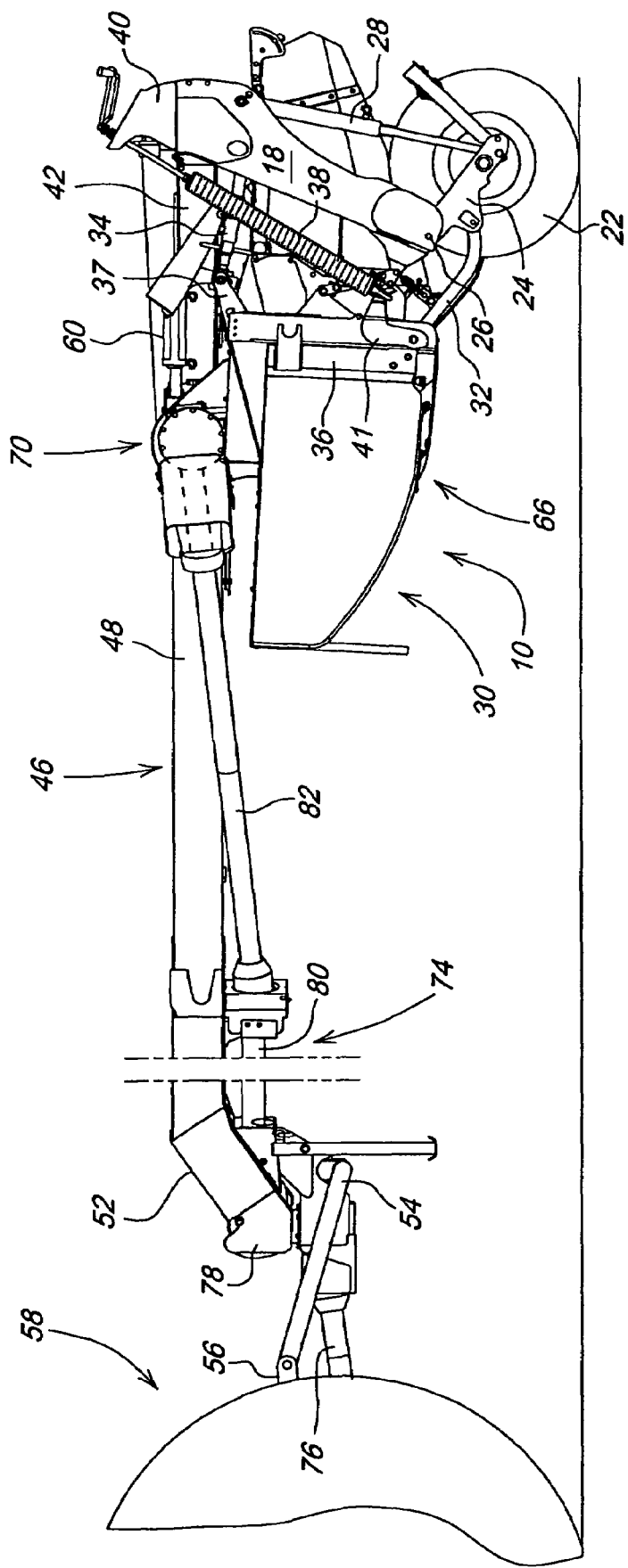
FIG. 2 is a left side elevational view of the mower-conditioner and towing tractor of FIG. 1, with the mower-conditioner shown in a raised position.

Referring now to FIGS. 1 and 2, there is shown a rotary side-pull mower-conditioner 10, including an inverted U-shaped carrier frame 12 comprising a transverse beam 14 extending between, and joined to, right- and left-hand depending legs 16 and 18, respectively. Right- and left-hand ground wheels 20 and 22 are respectively mounted to the legs 16 and 18, with only the structure for mounting the left-hand wheel 22 being clearly visible.

Specifically, a trailing wheel support arm 24 has a rear region, which carries an inwardly projecting axle (not visible) on which the wheel 22 is rotatably mounted, and has a forward end pivotally coupled to a lower region of the left-hand leg 18 by a transverse pin 26. Coupled between an upper rear region of the leg 18 and the wheel support arm 24 is an extensible and retractable hydraulic actuator 28. The right-hand wheel 20 is mounted to the right-hand leg 16 in a similar manner.

A header or platform 30 is suspended from the carrier frame 12 by a linkage including transversely spaced pairs of lower links 32 and an upper link 34. The pair of lower links 32 are respectively located in fore-and-aft alignment with the wheel support arms 24 and have forward ends pivotally coupled to lower rear regions of a header frame 36 and rear ends pivotally coupled to middle regions of the wheel support arms 24. The upper link 34 is in the form of a turnbuckle located inwardly of the left-hand frame leg 18 and having a forward end pivotally attached to a bracket 37 fixed to an upper rear region of the header frame 36, and having a rear end pivotally coupled to an upper inner location of the left hand leg 18. A pair of counterbalance springs 38 have respective upper ends attached to brackets 40 provided at the upper ends of the legs 16 and 18, and have respective lower ends respectively coupled to a pair of brackets 41 fixed to lower rear regions of the header frame 36.

Formed integrally with the carrier frame 12 is a tongue support 42 that is cantilevered from the transverse beam 14. The tongue support 42 has a relatively broad base 44 having a right-hand end that is located approximately midway between opposite ends of the beam 14. The position of the support 42 depends on the working width of the header 30. The tongue support 42 extends forwardly from the transverse beam 14 and has a forward end which is located above a rear region of the header frame 36. Referring to FIG. 1, it can be seen that an angled tongue 46 includes a rear section 48, that constitutes approximately two-thirds of the length of the tongue and has its rear end pivotally coupled to a forward region of the tongue support 42 by a pin 50 establishing a vertical axis about which the tongue 46 may be swung. Joined to a forward end of the tongue rear section 48, so as to form an included angle of about 140°, is a rear end of a tongue front section 52 having its forward end connected, as at a coupling structure 54, to a pair of draft arms 56 of a towing tractor 58. The disposition of the tongue 46 relative to the tongue support 42 is controlled by an extensible and retractable tongue swing cylinder 60 that extends between and has its opposite ends pivotally coupled to a bracket 62 fixed to a middle left region of the tongue support 42, and an ear 64 formed at a left side location of the tongue 46 at a location spaced forwardly of the tongue rear end. As shown in FIG. 1, the swing cylinder 60 is in a nearly fully retracted position wherein it disposes the front end of the tongue 46 at a location spaced sufficiently to the left of the mower-conditioner 10 that the tractor 58 is able to follow a path just to the left of standing crop which is to be cut by the mower-conditioner header 30.

The mower-conditioner header 30 is equipped with a rotary cutterbar 66 (FIG. 2) disposed transversely across the header 30 and having a plurality of cutting units (not shown) mounted in spaced relationship to each other along a line of centers 68 (FIG. 1) across the length of the cutterbar, with the cutting units cooperating with crop converging drums (not shown) at opposite ends of the cutterbar so as to cause a narrowed stream of crop to be fed to a conditioning assembly (not shown), having a width less than that of the cutterbar, mounted in a rear region of the header frame 36.

Provided for delivering power, for driving the cutting units of the cutterbar 66, the crop converging drums and conditioning rolls or an impeller rotor making up the conditioning assembly, is a main drive gearbox 70 having an input shaft 72, which is disposed at an angle of approximately 45° to an imaginary line extending straight ahead in the direction of travel. The gearbox 70 is mounted to a top wall of the header frame 36 at a location approximately in fore-and-aft alignment with the left-hand wheel 22, and slightly in front of the forward end of the tongue support 42. The tractor 58 is equipped with a power take-off shaft (not shown) for supplying the power for driving the driven mower-conditioner components, and this power take-off shaft is coupled to the main drive gearbox 70 by a driveline 74 including, as considered from front to rear, a front telescopic shaft 76, a swivel gearbox 78 carried by the tongue 46, a pedestal shaft 80 carried by the tongue 46 and a rear telescopic shaft 82. All of the connections between the various shafts and between the shafts and swivel gearbox 78 are effected by single cardan joints and the shafting locations and angles are chosen so that a smooth delivery of power takes place.

Figure 3:
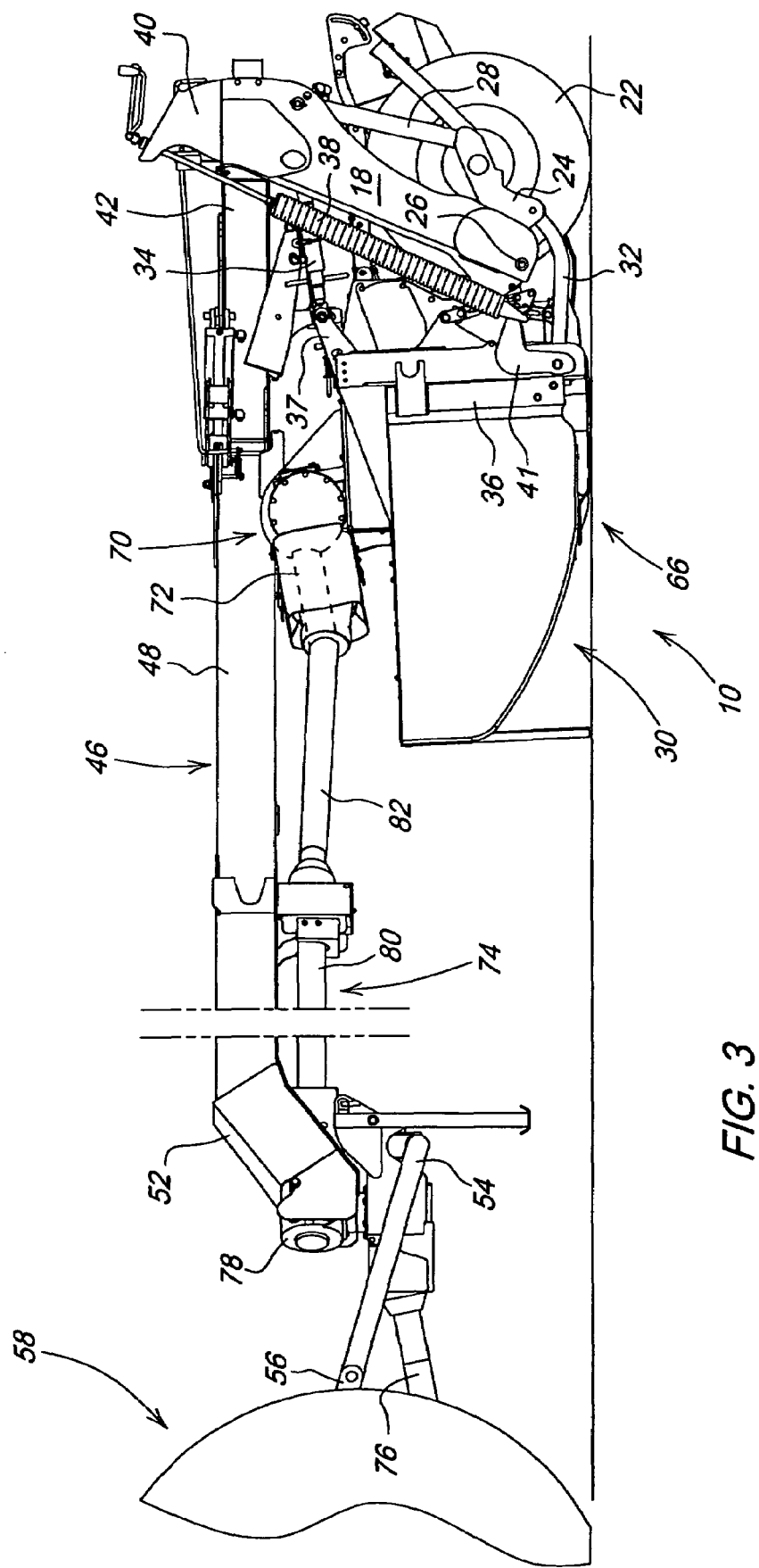
FIG. 3 is a view like that of FIG. 2, but showing the mower-conditioner in a lowered working position.

As can be seen in FIG. 2, the tongue 46 and gearbox 70 are located at approximately the same height when the header 30 is fully raised, as shown, however, there is no interference between the tongue 46 and the header 30. Further, with reference to FIG. 3, it can be seen that, when the header 30 is lowered for operation, there is ample space between the header 30 and the tongue 46 for the header 30 to float vertically without contacting the tongue 46.

Referring once again to FIG. 1, it can be seen that the relative positions of the tongue 46 and gearbox 70 are such that the tongue 46 may be swung between a maximum leftward position (this position is to the left of that shown and is achieved by fully contracting the swing cylinder 60), which is used, for example, when operating on a side hill, with the header 30 located uphill from the tractor 58, and a rightward transport position, which is achieved by fully extending the swing cylinder 60 so that the front of the tongue 46 is located approximately centered in front of the header 30 so that the width of the header 30 is the transport width. Since the tongue 46 does not have to swing above the gearbox 70, the tongue does not have to be arched above the header 30. Such arching would require the tongue 46 to be attached at a location further to the rear than the location shown. The fact that the tongue support 42 projects a considerable distance forward has the beneficial result that the tongue 46 does not have to be as long and can be removed and easily transported with the mower-conditioner 10 on a truck when the mower-conditioner is being shipped from its point of manufacture.

Having described the preferred embodiment, it will become apparent that various modifications can be made without departing from the scope of the invention as defined in the accompanying claims.

The invention claimed is:

1. In a rotary side-pull mower-conditioner including a carrier frame having a transverse beam and a pair of legs respectively joined to, and projecting downwardly from, opposite ends of said transverse beam, a pair ground wheels respectively mounted to lower regions of said pair of legs by respective ones of a pair of wheel support arms, a crop harvesting header being suspended from said carrier frame by suspension links extending between said carrier frame and a transverse header frame spaced forward of said carrier frame, a pair of wheel control actuators having first ends respectively coupled to said pair of legs, and second ends respectively coupled to said pair of wheel support arms and operable for effecting movement of said header between a raised transport position and a lowered working position, a tongue having a rear end mounted to said carrier frame for swinging about an upright pivot axis, and a gearbox being mounted to said header frame, the improvement comprising: said gear box being mounted to a top, left region of said header frame; and said carrier frame including a tongue support fixed to, and projecting forwardly from, said transverse beam and having a forward end terminating inwardly of said gearbox; said tongue having a rear end coupled to a forward end region of said tongue support for pivoting about said upright pivot axis; a tongue swing cylinder being coupled between said tongue support and said tongue and operable for swinging said tongue between a leftmost working position and a rightmost transport position; and said tongue and said gearbox being so located relative to each other that said tongue does not pass over said gearbox when swinging between said rightmost and leftmost positions.

2. The mower-conditioner, as defined in claim 1, wherein said gearbox defines an uppermost surface of said header; and said gearbox being located approximately at a height equal to said tongue when said header is in said working position.

3. The mower-conditioner, as defined in claim 1, wherein said tongue swing cylinder is located leftward of said upright axis.

4. A rotary side-pull mower-conditioner, comprising: a mobile carrier frame; a crop harvesting header including a header frame suspended from said carrier frame for movement between a raised transport position and a lowered working position; said header having a support frame; a rotary cutterbar mounted to a lower region of said support frame and including a plurality of cutting units located along a transverse centerline; a power distribution gearbox mounted to said support frame at a location above a leftmost cutting unit; said carrier frame including an integral tongue support projecting forward to a location above said cutterbar; a tongue having a rear end pivotally attached to a forward region of said tongue support for swinging about an upright axis between a leftmost working position and a rightmost transport position; a swing cylinder being coupled between said tongue support and said tongue and being operable for selectively swinging said tongue between said working and transport positions; and said tongue support being so located relative to said gearbox that said tongue passes in front of said gearbox when said tongue is located in said leftmost working position.

5. The rotary side-pull mower-conditioner, as defined in claim 4, wherein said gearbox is located at a height which is commensurate with that of said rear end of said tongue when said header is in said transport position.

6. The rotary side-pull mower-conditioner, as defined in claim 4, wherein said tongue is so located relative to said header that said header has adequate space for floating vertically from its lowered operating position without interfering with said tongue.

* * * * *